United States Patent [19]

Mori et al.

[11] 4,202,312
[45] May 13, 1980

[54] IGNITION DEVICE FOR ROTARY PISTON ENGINE

[75] Inventors: Kouichi Mori, Okazaki; Toshihiko Igashira, Toyokawa; Shunzo Yamaguchi, Okazaki, all of Japan

[73] Assignee: Toyota Jidosha Kogyo Kabushiki Kaisha, Toyota, Japan

[21] Appl. No.: 887,033

[22] Filed: Mar. 15, 1978

[30] Foreign Application Priority Data

Mar. 17, 1977 [JP] Japan .................................. 52-29451

[51] Int. Cl.$^2$ ............................................. F02B 53/12
[52] U.S. Cl. .................................. 123/210; 123/145 A
[58] Field of Search .................... 123/210, 211, 145 A

[56] References Cited

U.S. PATENT DOCUMENTS

| | | | |
|---|---|---|---|
| 2,130,365 | 9/1938 | Paulson | 123/145 A |
| 2,456,080 | 12/1948 | Wu Pe | 123/145 A X |
| 3,625,188 | 12/1971 | Jarnuskiewicz | 123/210 |

FOREIGN PATENT DOCUMENTS

| | | | |
|---|---|---|---|
| 884714 | 7/1953 | Fed. Rep. of Germany | 123/145 A |
| 1928648 | 12/1970 | Fed. Rep. of Germany | 123/211 |
| 1260221 | 3/1961 | France | 123/210 |

*Primary Examiner*—Michael Koczo
*Attorney, Agent, or Firm*—Cushman, Darby & Cushman

[57] ABSTRACT

An ignition device for a rotary piston engine includes a glow plug which is mounted at an ignition port formed in an engine housing to communicate with a combustion and operation chamber and which, when electrically powered, is heated to red hot to ignite an air-fuel mixture in the combustion and operation chamber. The glow plug ignites the air-fuel mixture through a communicating port which is formed to face the combustion and operation chamber and which has a smaller aperture area than the cross-section area of the ignition port.

8 Claims, 11 Drawing Figures

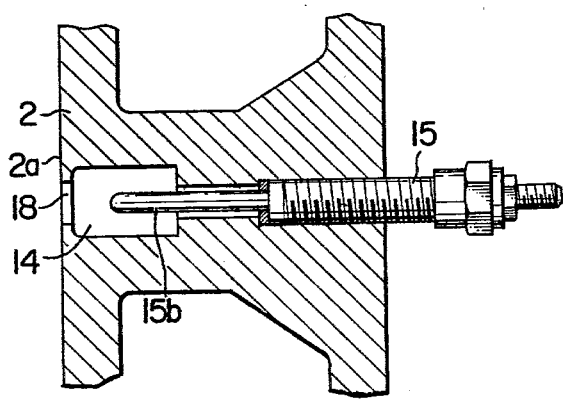
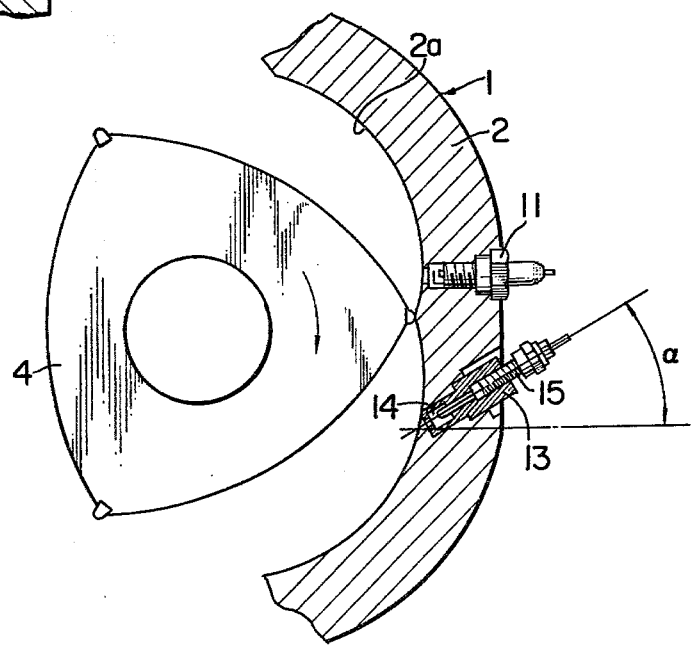
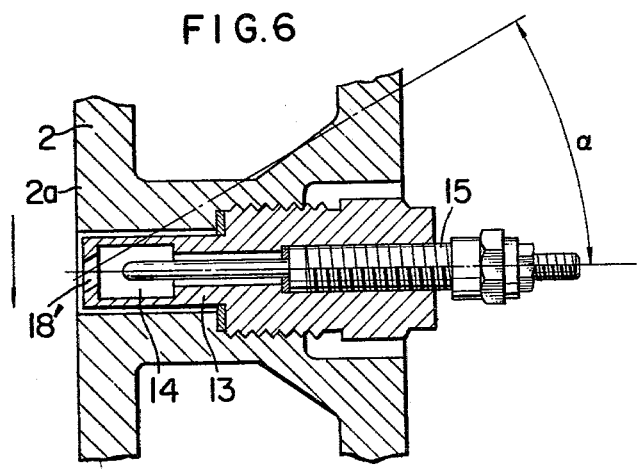

IGNITION DEVICE FOR ROTARY PISTON ENGINE

BACKGROUND OF THE INVENTION

The present invention relates to an ignition device for a rotary piston engine having a glow plug, and more particularly to a novel and improved structure to save power supplied to the glow plug and improve combustion.

The ignition in a rotary piston engine is usually carried out by two spark plugs which are called a leading plug and a trailing plug. However, since the rotary piston engine inherently has much internal recirculation of exhaust gas, misignition is apt to occur when the ignition is carried out by spark plugs, and in order to prevent misignition it is necessary to reduce the air-fuel ratio of the air-fuel mixture (or make the air-fuel mixture richer). This results in deterioration of the combustion efficiency.

The inventors of the present invention have made an extensive study to overcome the above difficulty and have found that combustion can be considerably improved even in a low speed-low load operation region where much recirculation of the exhaust gas is included, by using a glow plug instead of the conventional leading plug and hence the combustion efficiency is improved abd noxious exhaust gas components can be reduced. However, it also has been found that if the glow plug is continuously powered in order to enable the glow plug to ignite the air-fuel mixture over the entire operation range of the engine, a high electric power of more than 50 watts is required per glow plug if the glow plug is simply mounted on the engine housing. This is not practical for use in a commercial car. Further experiment has revealed that such a high power consumption is caused by the fact that an igniting portion of the glow plug is cooled too much because too much air-fuel mixture is directed to the igniting portion of the glow plug or the flow rate of the air-fuel mixture is too high around the igniting portion, and hence more electric power than that inherently required for the combustion of the air-fuel mixture is necessary.

SUMMARY OF THE INVENTION

It is an object of the present invention to prevent the undue cooling of the glow plug by newly supplied air-fuel mixture to save power fed to the glow plug.

In order to attain the above object, according to the present invention, an ignition port in which the glow plug is mounted is communicated with the combustion chamber through a communicating port having a smaller opening area than that of the ignition port so that the minimum amount of new air-fuel mixture necessary for the combustion of the air-fuel mixture is directed to the ignition port.

In accordance with a further feature of the present invention, the direction of opening of the ignition port is slanted toward the direction of the rotor rotation.

The term "glow plug" herein used is intended to include all of the plugs which function to ignite the air-fuel mixture under a heated-to-red-hot condition and is not intended to be limited only to a commonly used so-called glow plug.

BRIEF DESCRIPTION OF THE DRAWINGS

FIG. 5 shows a sectional view of a modification of the present device;

FIG. 6 shows a sectional view illustrating another embodiment of the present invention;

FIG. 7 shows a schematic sectional view of a modification of FIG. 6; and

DESCRIPTION OF THE PREFERRED EMBODIMENTS

Figure 1:
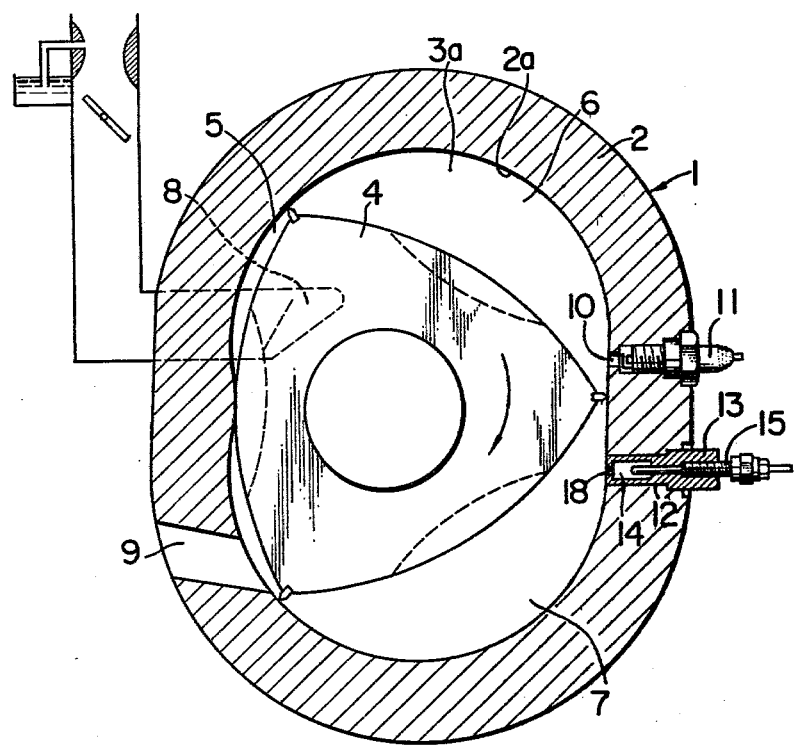
FIG. 1 shows a schematic diagram illustrating one embodiment where the device of the present invention is incorporated in a rotary piston engine.

Referring to the drawings, one embodiment of the present invention is now explained. FIG. 1 shows an example of rotary piston engine to which the present invention is applied. In FIG. 1, the engine housing 1 is typically, conventionally made of an aluminum based alloy and comprises a peripheral wall 2 having an inner wall contoured to have a trocoid curve, and a pair of side walls (not shown) each having an inner wall 3a including a planer facing the peripheral wall 2, and defines a cavity therein. A triangular rotor 4 is mounted in the cavity of the housing 1 to define three operating chambers 5, 6 and 7 between the rotor 4 and the inner walls 2a and 3a of the housing 1. As is well known, the rotor 4 undergoes planetary rotation in the direction of the arrow shown in FIG. 1 while changing the volumes of the respective operating chambers to provide a suction stroke, a compression stroke, a combustion stroke and an exhaust stroke to be carried out sequentially. The housing 1 is formed with a suction port 8 and an exhaust port 9, and each operating chamber takes in operating gas from the suction port 8 during the suction stroke and exhausts exhaust gas through the exhaust port 9 during the exhaust stroke. The operating gas may be an air-fuel mixture.

According to the present invention, a first ignition port 10 is formed in the peripheral wall 2 of the housing 1 of the rotary piston engine, and a spark plug 11 is mounted in the ignition port 10. The positions of the first ignition port 10 and the spark plug 11 are substantially the same as those for the trailing plug in a conventional rotary piston engine.

An attachment mounting bore 12 which extends from the outer wall to the inner wall is formed in the peripheral wall 2 of the housing 1 at a position which is displaced from the first ignition port 10 toward the leading side of the rotor rotation and which is located in the front half (as viewed in the direction of the rotor rotation) of the combustion chamber at the time of the top dead center of the rotor, and more preferably near the center of the front half or at one-quarter position from the leading end of the combustion chamber, and an attachment 13 is secured in the attachment mounting bore 12. The inside of the attachment 13 defines a second ignition port 14 in which an igniting portion 15b of a glow plug 15 attached to the attachment 13 is positioned.

Figure 2:
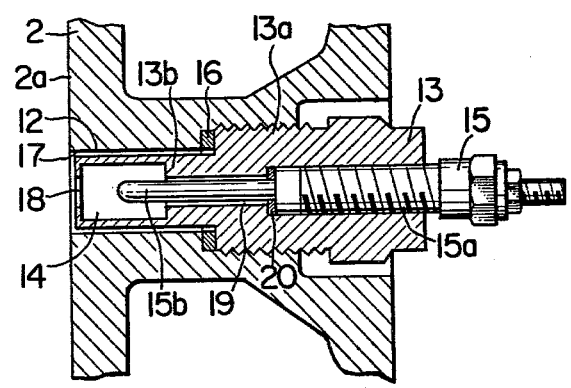
FIG. 2 shows a detailed sectional view illustrating a portion of FIG. 1.

A more detailed showing of the structure of those portions is provided in FIG. 2. The attachment 13 is generally tubular and has a mounting portion 13a at the rear end thereof and a reduced portion 13b at the front end thereof. The outer diameter of the reduced portion 13b is smaller than the diameter of the mounting portion 13a and has a space therein which corresponds to the second ignition port 14. The attachment 13 is screwed into and fixed to the peripheral wall 2 of the housing 1 by a thread formed at the mounting portion 13a. A gasket 16 is interposed between a shoulder of the attachment 13 and the housing 1 to seal the jointing surface. An appropriate gap 17 is provided between the outer periphery of the reduced portion 13b of the attachment 13, which forms the second ignition port 14 and the inner wall of the mounting bore 12 of the peripheral wall 2 of the housing 1 to suppress heat dissipation from the reduced portion 13b to the engine housing 1. The leading end of the attachment 13 is slightly retarded from the inner wall 2a of the peripheral wall 2 of the engine housing 1, and a communicating port 18 is formed at the leading end of the attachment 13 so that the second ignition port opens to the operating chamber through the communicating port 18. The opening area of the communicating port 18 is smaller than the area of the second ignition port 14 to impart a throttle effect. The attachment 13 is preferably made of a metal having a smaller heat conductivity than the material of the engine housing 1, such as of stainless steel to impart heat insulation to the second ignition port 14.

The glow plug 15 has a threaded mounting portion 15a and a portion 15b, and it is screwed into and fixed to the attachment 13 at the mounting portion 15a such that the igniting portion 15b is positioned in the second ignition port 14. A small gap 19 is provided between the outer periphery of the igniting portion 15b and the attachment 13 to suppress the heat transfer from the igniting portion 15b to the attachment 13. A gasket 20 is interposed between the end surface of the mounting portion 15a of the glow plug 15 and the attachment 13 to seal the joint surface. A battery (not shown) is connected to the glow plug 15 to power the same.

The communicating port 18 of the second ignition port 14 is formed at a position which is displaced from a minor axis of the trocoid curve of the peripheral wall 2 of the engine housing 1 toward the leading side in the direction of the rotation of the rotor 4 (that is, in the front half (as viewed in the direction of the rotor rotation) of the combustion chamber at the time of the top dead center of the rotor), and more preferably near the center of the front half, in order to prevent preignition and to attain maximum improvement in the combustion.

In the construction described above, the operating chambers 5, 6 and 7 are moved as the rotor 4 rotates while the volumes of the operating chambers change. Air-fuel mixture is taken through the suction part 8 during the suction stroke and the air-fuel mixture is compressed during the following compression stroke. The combustion stroke and exhaust stroke follow. At the end of the compression stroke, the air-fuel mixture in the operating chamber is ignited by the glow plug 15 and the spark plug 11 which is used auxiliarily and the combustion stroke follows. When the glow plug is heated to red-hot by the supply of the electric power, it sequentially ignites the air-fuel mixture which is directed to the second ignition port 14 as the rotor 4 rotates. Accordingly, since the air-fuel mixture is ignited continuously, positive ignition is assured and the occurrence of disordered combustion is prevented even under a low speed low load condition in which much recirculation of the exhaust gas is included and disordered combustion otherwise is apt to occur. The lean air-fuel mixture having an air-fuel ratio of approximately 16, for example, can be ignited positively and stably without making the mixture richer. The spark plug 11 may be used to ignite the air-fuel mixture only when the glow plug 15 does not yet have the ability of igniting the air-fuel mixture at the time of starting the engine or under a high load condition in which high engine power is required. It is, of course, possible to continuously input the function of igniting the air-fuel mixture to the spark plug 11.

In the construction described above, during the compression stroke (or combustion stroke), newly supplied air-fuel mixture is taken into the second ignition port 14 from the operating chamber through the communicating port 18. Since the communicating port 18 is throttled to have a smaller aperture than the area of the second ignition port 14, it restricts the amount of the air-fuel mixture taken into the second ignition port 14 to a minimum amount required to ignite the air-fuel mixture and prevents an extra amount of air-fuel mixture from flowing into the second ignition port 14. This prevents undue cooling of the igniting portion 15b of the glow plug 15 by the newly supplied air-fuel mixture so that the igniting portion 15b of the glow plug 15 is kept heated to a red hot condition with less power to the glow plug 15. The facts that the attachment 13 is made of the low heat conductivity material, that the gap 19 is provided between the igniting portion 15b of the glow plug 15 and that the attachment 13 and the gap 17 is provided between the reduced portion 13b of the attachment 13 and the peripheral wall 2 of the engine housing 1 also contribute to the attainment of the ability of the glow plug 15 to ignite the air-fuel mixture with less power, because those facts reduce the heat dissipation from the igniting portion 15b of the glow plug 15 and the second ignition port 14.

Thus, according to the construction described above, the glow plug 15 has the ability of igniting the air-fuel mixture with less power to the glow plug 15, and hence the combustion is improved, the combustion efficiency of the rotary engine is improved and clean exhaust gas is attained with less electric power.

Figure 3A:
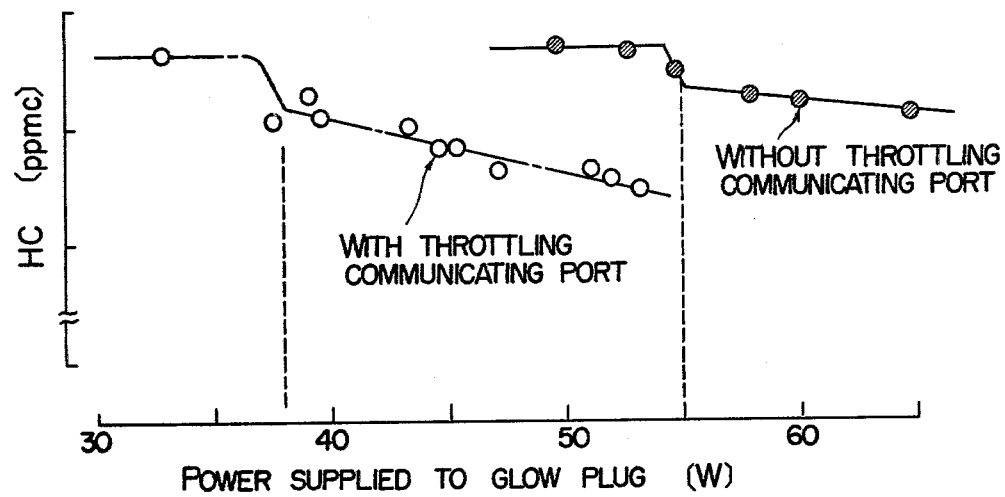
FIGS. 3A and 3B and FIG. 4 show charts illustrating the results of experiments.
Figure 3B:
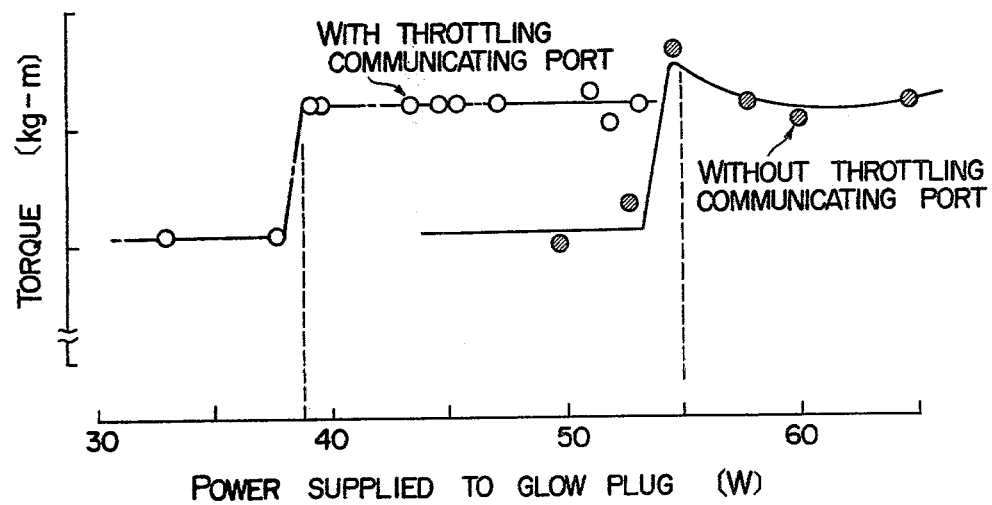

FIGS. 3A and 3B show the results of an experiment which proved the effect of the communicating port 18 having the throttle function. The experiment was made for a structure which has an ignition port (second ignition port 14) having an inner diameter of 10 mm, which is opened to the operating chamber through a communicating port having an inner diameter of 4 mm and a structure in which an ignition port having an inner diameter of 10 mm opens directly to the operating chamber, and results from both tests were compared. The engine r.p.m. was 1400 r.p.m. the suction vacuum was 360 mmHg, the air-fuel ratio was 15, and the power to the glow plug 15 was changed to measure the amount of exhaust of HC (FIG. 3A) and the torque (FIG. 3B). The displacement (stroke volume per operating chamber) of the engine used in the experiment was 650 cc and the volume of the ignition port was 1 cc. The volume of the ignition port need not be limited to 1 cc but it has been proved that a similar effect to that shown in FIGS. 3A and 3B can be attained by having an ignition port volume of 0.5–1.5 cc for an engine having a displacement of 650 cc. It has also been proved that when an engine of different displacement is used the ignition port volume may be changed proportionally, that is, to approximately 0.077–0.23% of the displacement.

Figure 4:
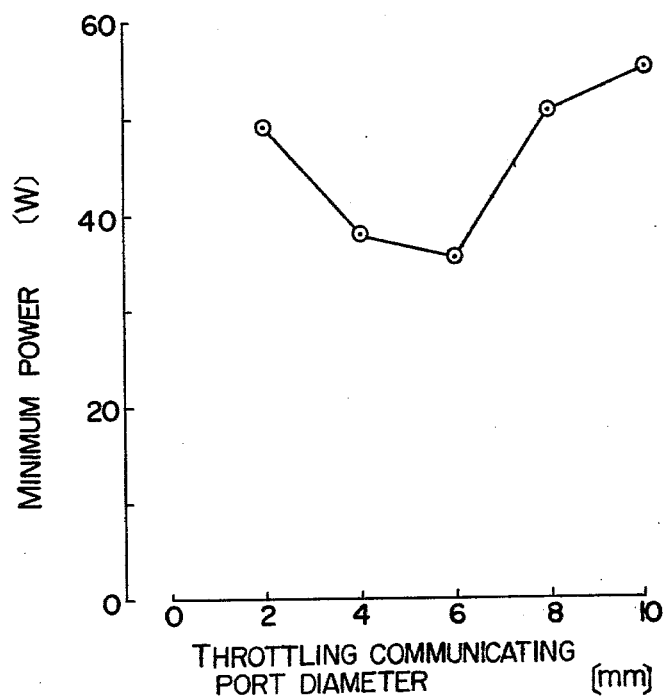

FIG. 4 shows the change in the power fed to the glow plug when the inner diameter of the communicating port 18 in the first embodiment described above is changed. The plots in FIG. 4 show minimum power to be fed to the glow plug when the amount of exhaust of HC decreases stepwise and the torque increases stepwise.

A summary of the conditions in the experiment is as follows:

| | |
|---|---|
| displacement: | 650 cc |
| volume of ignition port: | 1 cc |
| suction vacuum: | 360 mmHg |
| air-fuel ratio: | 15 |

It is seen from FIG. 4 that the range of the inner diameter of the communicating port which allows the power supplied to the glow plug to be limited to not more than 40 watts is approximately 3.5–6.5 mm. The preferable range of the inner diameter 1 to allow the limitation of the power to not more than 40 watts changes substantially proportionally to the volume of the ignition port. Accordingly, the cross-sectional area of the communicating port may be selected to be approximately 0.095–0.33 cm$^2$ per unit volume (1cc) of the ignition port volume. The range of the cross-sectional area of the communicating part is indicated herein relative to the ignition port volume because the shape of the cross-section of the communicating port is not necessarily circular.

In FIGS. 3A and 3B, the circular marks indicate the results of the experiment for the structure with the throttling communicating port and the dots indicate those for the structure without throttling communicating port.

As the power supplied to the glow plug is increased to raise the temperature of the igniting portion of the glow plug, the temperature of the igniting portion finally reaches a temperature which enables the ignition of the air-fuel mixture, when it is ignited. As the ignition starts, the amount of exhaust of HC rapidly decreases, and the power supplied to the glow plug when the torque increases stepwise defines a minimum power to be supplied to the glow plug. It is seen from FIG. 3A that the minimum power is about 55 watts when the throttling communicating port is not provided while it is approximately 38–39 watts when the throttling communicating port is provided. It is thus seen that more than 30% of the power can be saved in the latter case. It is apparent that the present construction can considerably reduce the power needed to be supplied to the glow plug and impart sufficient effect of improvement of combustion to the glow plug.

While the second ignition port and the communicating port therefor are provided in the attachment in the above embodiment, the second ignition port 14 may be formed in the peripheral wall 2 of the engine housing 1, as shown in FIG. 5, and may be opened to the inner wall 2a through the small diameter communicating port 18, which is also formed in the peripheral wall 2, to communicate with the operating chamber. In this modification, the glow plug 15 is directly screwed into and fixed to the peripheral wall 2 of the engine housing 1 such that the igniting portion 15b is positioned within the ignition port 14.

FIG. 6 shows another embodiment of the present invention. In the FIG. 6 embodiment, the direction of opening to the operating chamber (the inner wall of the peripheral wall of the housing), of the throttling communicating port 18' formed at the end of the attachment 13 is slanted relative to a normal line, drawn at that position, to the inner wall 2a of the peripheral wall 2 of the housing 1, by an appropriate angle α toward the direction of the rotor rotation (downward in the drawing). The other parts are similar to those shown in the embodiment of FIGS. 1 and 2.

In the rotary piston engine, a relatively strong flow of gas as shown by the arrow at the left in FIG. 6 occurs in the operating chamber in the direction of the rotor rotation as the rotor rotates. By slanting the communicating port 18' relative to the gas flow as described above, the flow of the air-fuel mixture into the ignition port 14 is further suppressed. Thus, the control of the minimum amount of power to be supplied to the glow plug to ignite the air-fuel mixture is facilitated. As a result, the glow plug 15 is able to have a proper function of igniting the air-fuel mixture with less power to the glow plug 15. Further, since the flame produced in the ignition port 14 by the ignition is ejected through the communicating port 18' in the direction of the flow of the air-fuel mixture in the operating chamber, a stabler combustion can be attained.

The same effect can be attained by attaching the attachment 13 and the glow plug 15 slantwise to the peripheral wall 2 of the engine housing 1, as shown in FIG. 7, rather than slanting only the communicating port 18' as described above.

The mounting of the glow plug 15 (attachment 13) to the peripheral wall 2 of the housing 1 is easier in the case of FIG. 7 wherein the glow plug (attachment) is attached to the peripheral wall 2 of the housing 1 slantwise than in the case of FIG. 6 wherein only the communicating port is slanted, because in the case of FIG. 6 the attachment 13 is screwed into the peripheral wall 2 of the housing 1 and hence it is troublesome to orient the communicating port 18' to coincide with the direction of rotation of the rotor.

Figure 8:
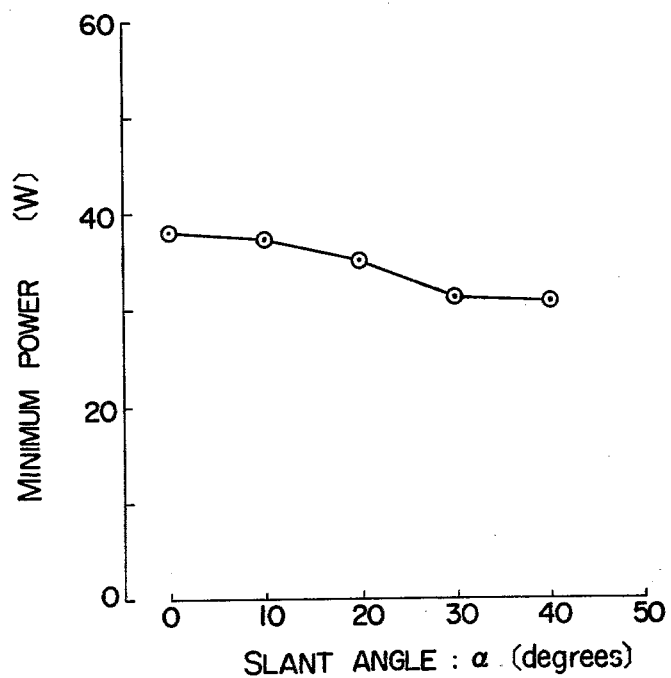
FIGS. 8, 9 and 10 show charts illustrating the results of experiments.
Figure 9:
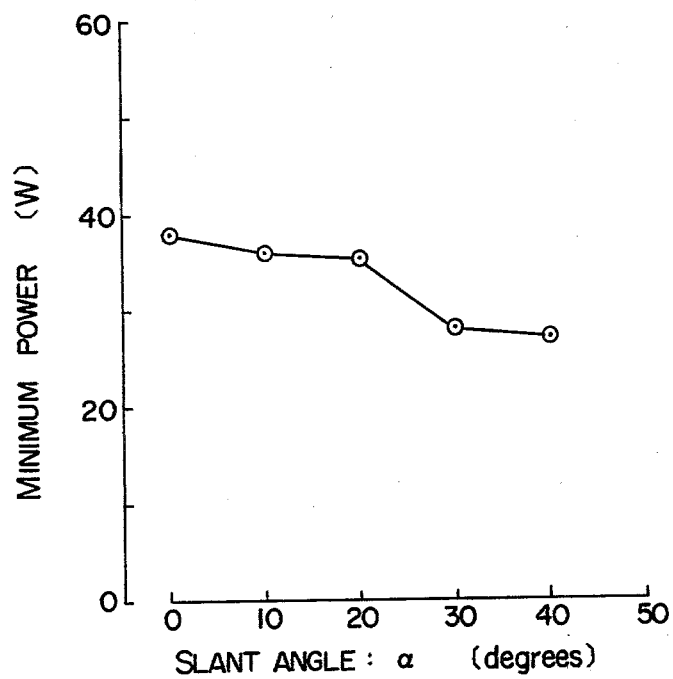

FIGS. 8 and 9 show the changes in the minimum power when the slant angle α is changed in the embodiments of FIGS. 6 and 7, respectively. The operating conditions of the engine are idential to those described above in connection with the first embodiment.

It is seen from FIGS. 8 and 9 that the minimum power can be reduced as the slant angle increases, and the effect is remarkable when the slant angle is between 30° and 40°.

Figure 10:
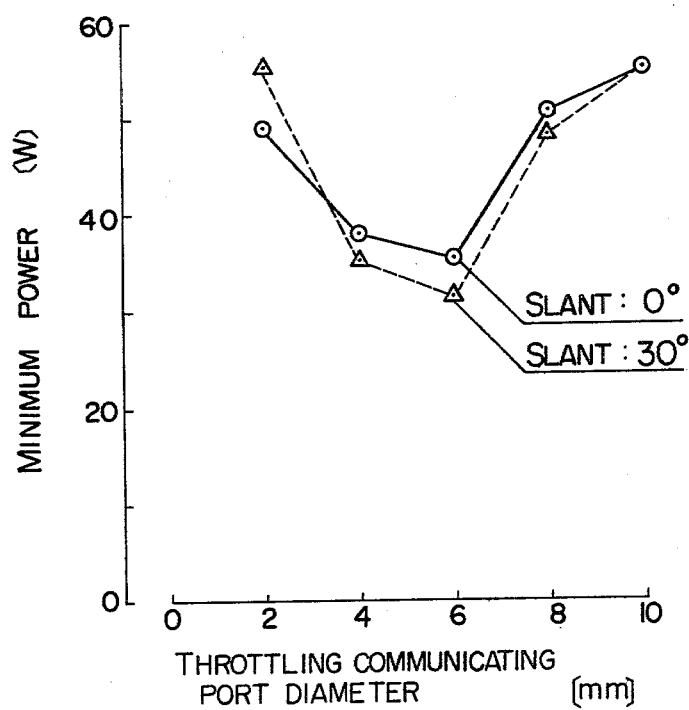

FIG. 10 shows the change in the minimum power when the inner diameter of the communicating port is changed in two attachments having the slant angle of the communicating port of 0° and 30°, respectively. It is seen from FIG. 10 that when the communicating port is slanted, the reduction of the minimum power is remarkable when the inner diameter of the communicating port is between approximately 3.5 mm and 6.5 mm (or when the cross-sectional area with respect to the volume of the second ignition port is between approximately 0.095 and 0.33 cm$^2$/cc).

It should be noted that the minimum power when the inner diameter of the communicating port is 2 mm is higher in the case of the slant communicating port than in the case of non-slant communicating port.

As described hereinabove, according to the present invention, the power required for the glow plug to have the ability of igniting the air-fuel mixture can be reduced by opening the ignition port for the glow plug to the operating chamber through the communicating port having a throttling function. Accordingly, the improvement of the combustion efficiency of the rotary piston engine and clearer exhaust gas can be attained with less electric power.

In addition, by opening the communicating port slantwise in the direction of the rotor rotation, the power to be supplied to the glow plug can be significantly reduced and the propagation of flame to the operating chamber is promoted.

By way of example, when the attachment which is separate from the engine housing is used, the glow plug and the ignition port can be heat-insulated more effectively and a communicating port which has optimum area and shape to the engine can be chosen by replacing the attachment.

What is claimed is:

1. An ignition device for a rotary piston engine having a rotor for defining a combustion and operation chamber with an engine housing and an attachment mounting bore formed in said engine housing to communicate with said operation chamber, comprising:
   a glow plug for igniting air-fuel mixture in said operation chamber; and
   an attachment means detachably mounted in said mounting bore, that end of said attachment means which is farther from said operation chamber having a mounting portion to mount said glow plug thereon, that side of said attachment means which faces said operation chamber having a cavity for defining an ignition port for said glow plug, that end of said attachment means which faces said operation chamber having a communicating port having a smaller aperture area than a cross-sectional area of said ignition port a longitudinal axis of said attachment means being on a plane perpendicular to an axis of rotation of said rotor, and also being slanted to a normal line drawn at the position of opening to an inner wall of said engine housing, toward the direction of rotation of said rotor;
   whereby said glow plug ignites said air-fuel mixture through said communicating port.

2. An ignition device according to claim 1, wherein said attachment means is made of a material having smaller heat conductivity than said engine housing.

3. An ignition device according to claim 1, wherein a cross-sectional area of said communicating port is approximately 0.095 to 0.33 $cm^2$ per unit volume (1 $cm^3$) of said ignition port.

4. An ignition device according to claim 1, wherein gaps are formed between said attachment means and said mounting bore and between said attachment and a redheated portion of said glow plug, respectively.

5. In an ignition device for a rotary piston engine comprising a plug mounting bore formed in an engine housing which defines a combustion and operation chamber of the engine with a rotor thereof, said plug mounting bore communicating with said operation chamber, and a glow plug mounted in said plug mounting bore, said glow plug being adapted to be red-heated, when it is electrically powered, to ignite an air-fuel mixture in said operation chamber,
   the improvement comprising:
   means for defining an ignition port within said plug mounting bore and defining a communicating port in facing relation to said operation chamber, said communicating port having a smaller aperture area than a cross-sectional area of said ignition port, a longitudinal axis of said glow plug being on a plane perpendicular to an axis of rotation of said rotor, and also being slanted to a normal line drawn at the position of opening to an inner wall of said engine housing, toward the direction of rotation of said rotor;
   whereby said glow plug ignites the air-fuel mixture in said operation chamber through said communicating port.

6. An ignition device according to claim 5, wherein said means includes a cavity formed in that portion of said engine housing in which said plug mounting bore is formed, said cavity serving as said ignition port, and said communicating port is formed in that portion of said engine housing at which said plug mounting bore faces said operation chamber.

7. An ignition device according to claim 5, wherein a volume of said ignition port is approximately 0.077 to 0.23% of a stroke volume of said operation chamber.

8. An ignition device according to claim 5 or 1, wherein the slant angle is approximately 30° to 40°.

* * * * *